(12) United States Patent
Straka

(10) Patent No.: US 9,662,818 B2
(45) Date of Patent: May 30, 2017

(54) METHOD OF METERING PLASTIC GRANULAR MATERIAL

(71) Applicant: ENGEL AUSTRIA GmbH, Schwertberg (AT)

(72) Inventor: Klaus Straka, Marchtrenk (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 0 days.

(21) Appl. No.: 14/825,583

(22) Filed: Aug. 13, 2015

(65) Prior Publication Data
US 2016/0046054 A1 Feb. 18, 2016

(30) Foreign Application Priority Data
Aug. 14, 2014 (AT) ...................................... 638/2014

(51) Int. Cl.
| | | |
|---|---|---|
| *B29C 45/47* | (2006.01) | |
| *B29B 13/02* | (2006.01) | |
| *B29B 13/08* | (2006.01) | |
| *B29C 45/18* | (2006.01) | |

(Continued)

(52) U.S. Cl.
CPC ............. *B29C 45/47* (2013.01); *B29B 13/02* (2013.01); *B29B 13/08* (2013.01); *B29C 45/18* (2013.01); *B29C 45/1808* (2013.01); *B29C 45/60* (2013.01); *B29C 45/78* (2013.01); *B29C 2945/76531* (2013.01); *B29C 2945/76665* (2013.01); *B29C 2945/76765* (2013.01); *B29C 2945/76846* (2013.01)

(58) Field of Classification Search
CPC ...... B29C 45/18; B29C 45/1808; B29C 45/47
USPC .......................................................... 366/76.2
See application file for complete search history.

(56) References Cited

U.S. PATENT DOCUMENTS

| | | | | |
|---|---|---|---|---|
| 2,838,790 A | * | 6/1958 | Hartman | B29C 47/1054 425/202 |
| 5,634,715 A | * | 6/1997 | Stehr | B01F 3/1271 366/137 |
| 5,951,163 A | | 9/1999 | Jen et al. | |

(Continued)

FOREIGN PATENT DOCUMENTS

| | | |
|---|---|---|
| DE | 10 2010 024 267 | 12/2011 |
| DE | 10 2013 012 067 | 1/2014 |

(Continued)

OTHER PUBLICATIONS

Praher et al. "An ultrasound-based system for temperature distribution measurements in injection moulding: system design, simulations and off-line test measurements in water". Jul. 10, 2013. Measurement Science and Technology. vol. 24, No. 8. pp. 1-9.*

(Continued)

*Primary Examiner* — Abbas Rashid
(74) *Attorney, Agent, or Firm* — Wenderoth, Lind & Ponack, L.L.P.

(57) ABSTRACT

A method of influencing a melt temperature in a plasticizing cylinder of a plasticizing unit (1) for an injection molding machine having a plasticizing screw (4) arranged rotatably and displaceably in a cylinder bore of the plasticizing cylinder which extends axially, wherein metering of plastic granular material fed to the plasticizing unit (1) is effected in dependence on a desired melt temperature in the plasticizing unit (1).

9 Claims, 5 Drawing Sheets

(51) Int. Cl.
 *B29C 45/60* (2006.01)
 *B29C 45/78* (2006.01)

(56) References Cited

U.S. PATENT DOCUMENTS

2004/0164437 A1* 8/2004 Morton-Finger ....... B29C 47/92
 264/40.5
2006/0197254 A1* 9/2006 Onishi ............... B29C 47/6018
 264/211.21
2009/0004325 A1* 1/2009 Bacher ............... B29B 17/0026
 425/586

FOREIGN PATENT DOCUMENTS

JP 4-94914 3/1992
JP 6-39120 5/1994

OTHER PUBLICATIONS

Kobayashi M. et al., "High Temperature Ultrasonic Transducer for Monitoring of Micro-Molding," 2003, IEEE Ultrasonics Symposium Proceedings. Honolulu, Hawaii, Oct. 5-8, pp. 1-6.
Rauwendaal, C., "Polymer Extrusion," 4th Edition, Hanser Munich, 2001, pp. 251-253.
White, James L. et al., "Screw Extrusion," Hamer Munich, 2003, pp. 205-207.
Amano, Osamu et al., "Temperature Measurements of Polymer Melts in the Heating Barrel During Injection Molding. Part 3: Effects of Screw Geometry," Polymer Engineering and Science, Apr. 1990, vol. 30, No. 7, pp. 385-393.
Amano, Osamu et al., "Temperature Measurements of Polymer Melts in the Heating Barrel During Injection Molding. Part I. Temperature Distribution Along the Screw Axis in the Reservoir," Polymer Engineering and Science, Dec. 1988, vol. 28, No. 23, pp. 1565-1571.

* cited by examiner

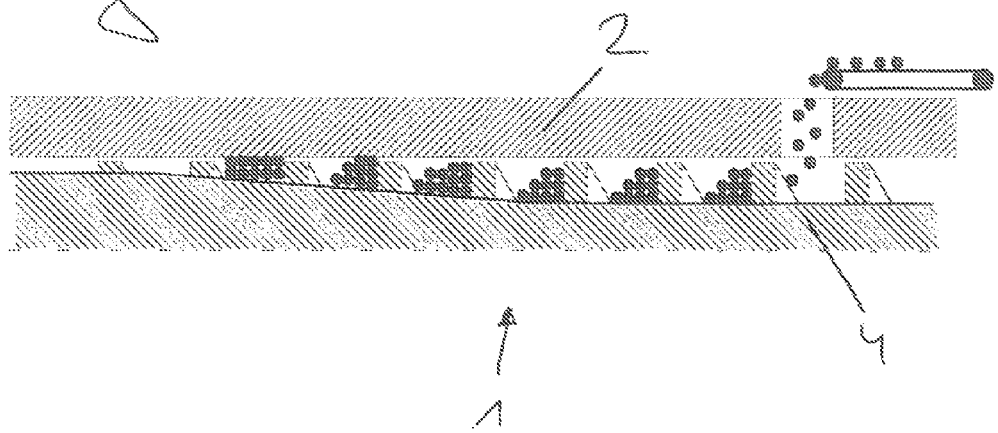
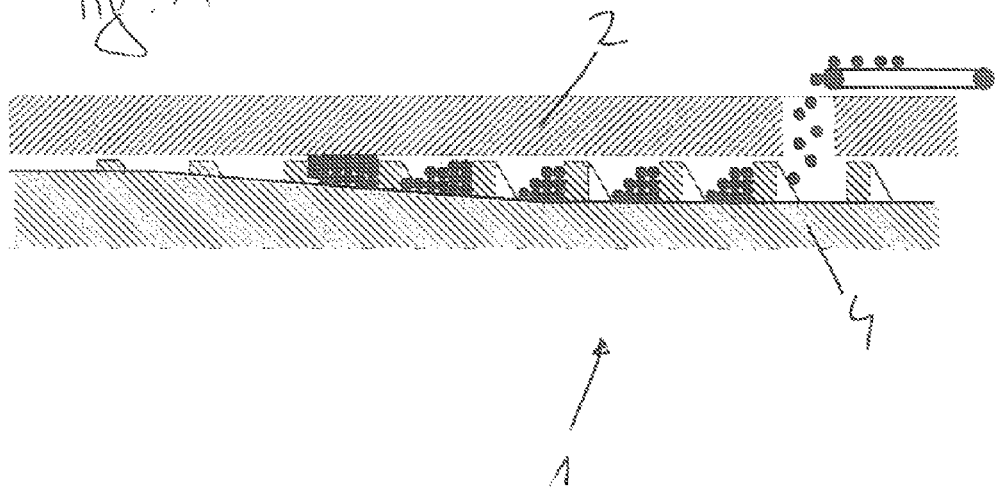

METHOD OF METERING PLASTIC GRANULAR MATERIAL

BACKGROUND OF THE INVENTION

1. Field of the Invention

The present invention concerns a method of influencing a melt temperature in a plasticizing cylinder of a plasticizing unit.

2. Description of Related Art

In plasticizing units of the general kind set forth, unwanted axial temperature gradients occur in the screw prechamber during plasticization of the melt reservoir required for the injection procedure. The reason for this is a reduction in the effective screw length (see C. Rauwendaal, "Polymer Extrusion" 4th edition, Hanser Munich 2001) in the metering operation and the change linked thereto in the shearing history and the residence time of individual granules and fluid elements as well as the axial temperature gradients in the plasticizing cylinder.

In an injection molding process, the melt temperature in the screw prechamber can be influenced by the following control parameters (see for example DE 10 2010 024 267 A1 and J. L. White, H. Potente, "Screw Extrusion", Hanser Munich, 2003):

Temperature control in the plasticizing cylinder:
  The temperature of the melt is influenced by means of suitable profile presettings with respect to heating of the plasticizing cylinder.
Dynamic pressure:
  The temperature of the melt is influenced by means of suitable profile presettings with respect to dynamic pressure regulation of the plasticizing unit.
Screw rotary speed (or screw peripheral speed):
  The temperature of the melt is influenced by means of suitable profile presettings with respect to rotary speed regulation of a motor of the plasticizing screw of the plasticizing unit.

The use of temperature control of the plasticizing cylinder as a control parameter for melt temperature regulation can only be implemented in a limited manner when using conventional cylinder heating by means of ceramic heating bands by virtue of inertia of the system and poor temperature conductivity of the melt.

A better intervention option is afforded here by a change in the rotary speed and/or the dynamic pressure, for example, a rising speed or dynamic pressure towards the end of the plasticizing procedure in order on the one hand to ensure a higher input of energy into the melt, and on the other hand to increase the residence time of the melt in the plasticizing screw.

SUMMARY OF THE INVENTION

The object of the invention is to provide a method of the general kind set forth, which has an improved option over the discussed state of the art for influencing the melt temperature in the plasticizing cylinder of a plasticizing unit for an injection molding machine.

That object is attained by a method having the features described below.

As mentioned in the opening part of this specification, temperature gradients occur in the screw prechamber of a plasticizing unit in part by virtue of a change in the effective screw length of the plasticizing screw during the plasticizing process. If metering of plastic granular material fed to the plasticizing unit is performed in dependence on a desired melt temperature in the plasticizing unit, it is possible to influence an effective screw length of the plasticizing screw.

Advantageous embodiments of the invention are defined in the appendant claims.

The metering operation can be effected by means of commercially available gravimetric or volumetric metering units. Depending on the supplied volume flow of the granules of the plastic to be plasticized, the position of the initial pressure build-up can be varied, which corresponds to a change in the operative or effective screw length of the plasticizing screw.

It is preferably provided that the plasticizing screw is underfed during the metering operation. Underfeeding means that less granular material is fed to the plasticizing screw, than the plasticizing screw can convey in the intake zone. As a result, the screw flights are completely filled only as from a given spacing from the intake opening. From that point, the pressure build-up in the plasticizing unit also begins.

If, for example, specifically targeted underfeeding of the plasticizing screw is effected during the plasticizing operation in such a way that the effective screw length is constant, then unwanted temperature gradients can be eliminated.

Alternatively, it can be provided that the plasticizing screw is underfed during the metering operation in such a way that the effective screw length of the plasticizing screw is shortened during the plasticizing phase.

It can also be provided that the plasticizing screw is underfed during the metering operation in such a way that the effective screw length of the plasticizing screw is increased during the plasticizing phase. That gives rise to higher melt temperatures.

A particularly preferred method is one in which a desired temperature gradient of the temperature variation in the plasticizing cylinder is predetermined and the metering operation is so effected that the desired temperature gradient occurs in the plasticizing cylinder.

BRIEF DESCRIPTION OF THE DRAWINGS

The invention is discussed in detail with reference to FIGS. 1 through 7.

FIG. 1 shows the situation in a plasticizing unit 1, wherein metering is so effected that a given degree of underfeed A occurs. Complete filling is effected in the sixth screw flight, starting from the filling opening in the direction towards the screw tip.

If specifically targeted underfeeding of the plasticizing screw is effected during the plasticizing operation in such a way that the effective screw length is constant, it is possible for unwanted temperature gradients to be substantially eliminated. In addition, there is the possibility of the remaining temperature gradients being influenced by a specific increase or reduction in length of the plasticizing screw.

FIG. 2 shows an example for underfeeding of the plasticizing screw 4 with a degree of underfeed B>A. Complete filling is first effected in the seventh screw flight, starting from the filling opening in the direction towards the screw tip. That reduction in the operative screw length leads to lower pressures, later initiation of melting and shorter residence times and thus lower melt temperatures.

Figure 3:
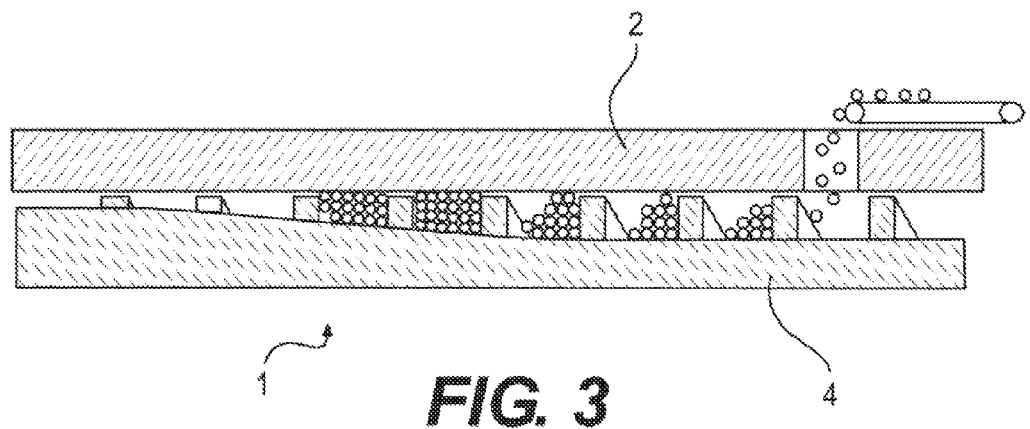

In the case of an increase in the operative screw length by a reduction in the degree of underfeed B<A, the position of the first pressure build-up moves in a direction towards the filling opening. That situation is shown in FIG. 3. Complete filling is already effected in the fifth screw flight, starting from the filling opening in the direction towards the screw tip. That leads to increased pressures along the plasticizing screw, earlier initiation of melting of the granular materials and longer residence times and thus higher melt temperatures.

Figure 4:
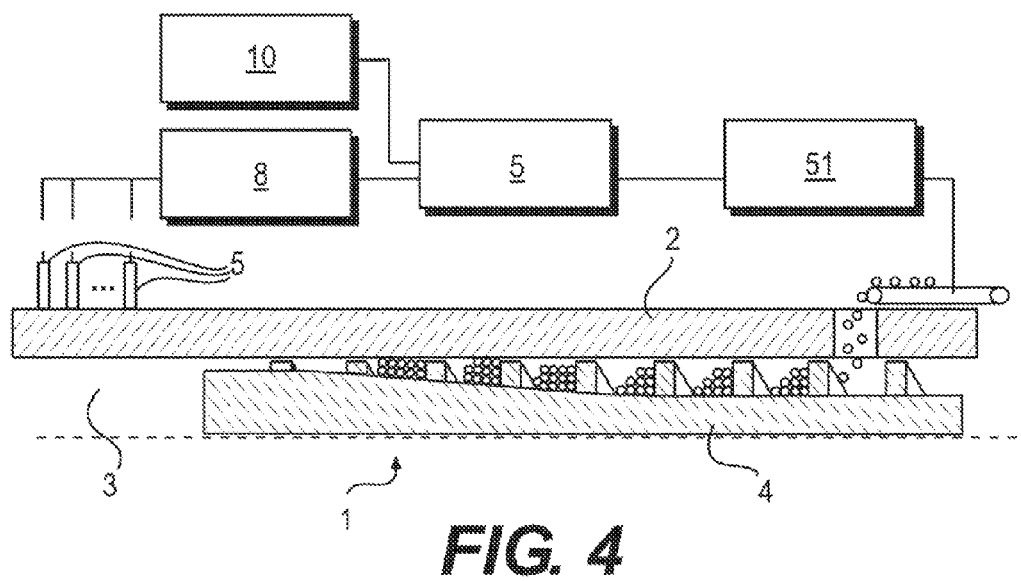
Figure 7:
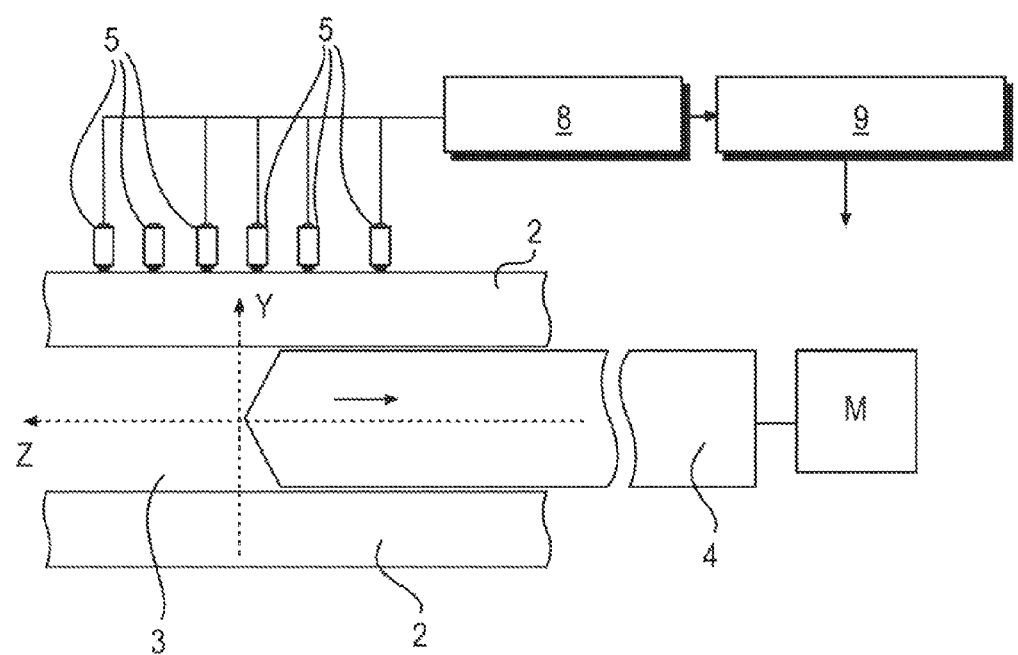

The above-described method affords a new control parameter for use in a melt temperature regulating circuit for the temperature in the screw prechamber (FIGS. 4 and 7). Reference 51 in FIG. 4 refers to an open-loop or closed-loop control device for the metering device.

In that case, measurement of the temperature is preferably effected with an ultrasound-based temperature measuring system of the kind described hereinafter with reference to FIGS. 5 through 7.

DETAILED DESCRIPTION OF THE INVENTION

The Figures show a portion of a plasticizing unit 1 for an injection molding machine in the form of a rotatable plasticizing screw 4 arranged displaceably in a cylinder bore of a plasticizing cylinder (with wall 2). The plasticizing screw 4 is moved away from the injection nozzle by the metering feed of plasticized plastic material in the region between the injection nozzle (not shown) and the tip of the plasticizing screw 4 (screw prechamber 3). In that case, a so-called mass cushion is formed in the screw prechamber 3.

If an ultrasound pulse is sent through a plastic melt along a sound transit path S (between an ultrasound transmitter and an ultrasound receiver), the transit time $t_{transit}$ of the pulse through the melt derives from the formula:

$$t_{transit} = \int_S \frac{ds}{c_{L,s}(p, T)}$$

wherein $c_{L,s}(p,T)$ denotes the longitudinal speed of sound which is dependent on the pressure p and the temperature T at a position s along the sound transit path.

If the longitudinal speed of sound $c_L$ is known as the function of the pressure p and the temperature T (by calibration measurements or preferably by looking-up-tables known to a person skilled in the art, which give the transit time of sound for various plastics—that is possible because at least approximately a constant pressure is obtained in the screw prechamber in the metering operation), it is possible to arrive at the mean temperature along the sound transit path S from the transit time measurement.

Ultrasound transit time measurements are carried out at a plurality of axial positions for measuring the axial temperature distribution in the screw prechamber 3. The measurements can be performed by means of so-called reflection or transmission measurements. Alternatively, measurement can also be implemented with one ultrasound transducer 5 alternately at different axial positions over a plurality of injection molding cycles.

Figure 5:
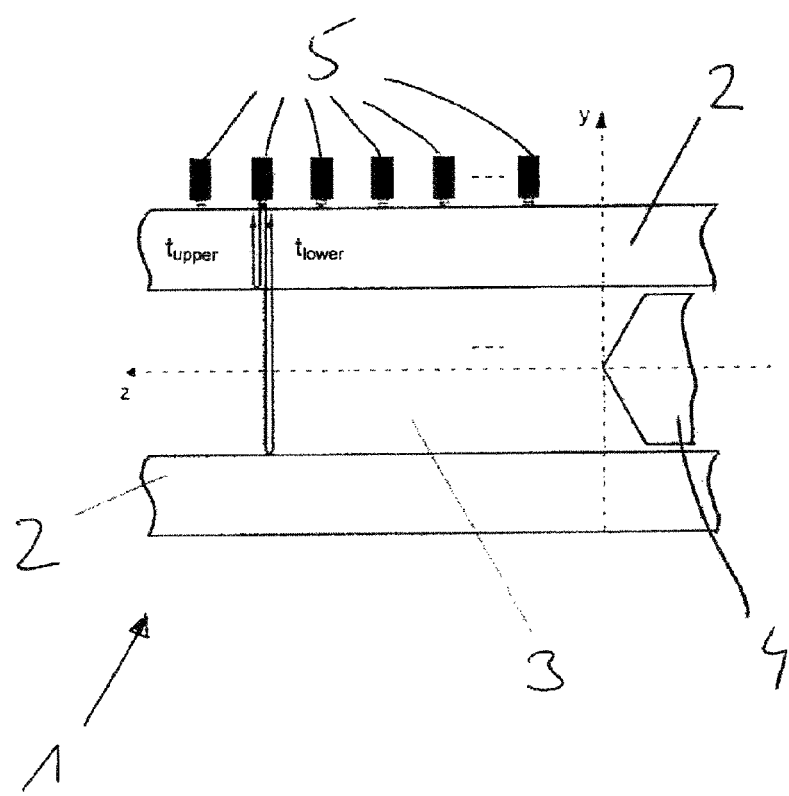

Reflection measurement is shown in FIG. 5. Axial measurement of the melt temperature is effected in the screw prechamber 3.

An ultrasound transducer array with a plurality of ultrasound transducers 5 is disposed along the screw prechamber 3 at the wall 2 of the plasticizing cylinder. An ultrasound pulse which is passed into the plasticizing cylinder is reflected at the upper edge of the cylinder bore. A part of the sound energy further passes through the plasticized plastic melt, is reflected at the lower edge of the cylinder bore and goes back to the ultrasound transducer. The speed of sound (at the dynamic pressure $p_{dynamic}$ during the metering feed) and thus the mean melt temperature $T_m$ along the sound transit path can be inferred from the difference in the transit times of reflections at the upper and lower edges ($t_{upper}$ and $t_{lower}$) of the cylinder bore and the known cylinder diameter $d_{cylinder}$:

$$c_L(p = p_{dynamic}, T_m) = \frac{2 d_{cylinder}}{t_{upper} - t_{lower}}$$

Measurement at various axial positions gives an axial temperature profile in the screw prechamber 3. Calculation is effected in an evaluation unit 8 shown in FIGS. 4 and 7.

Figure 6:
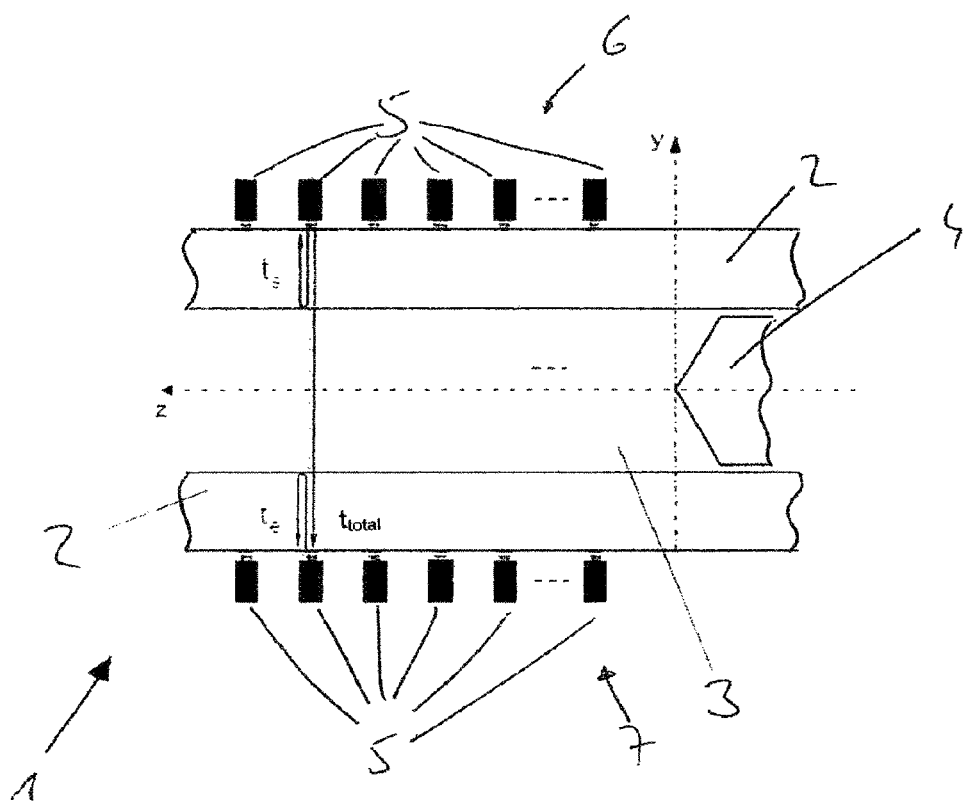

In transmission measurement, shown in FIG. 6, two mutually opposite ultrasound transducer arrays 6, 7 with ultrasound transducers 5 are mounted at different axial positions along the screw prechamber 3 at the wall 2 of the plasticizing cylinder, wherein the one ultrasound transducer array is used as a transmitter array 6 and the opposite ultrasound transducer array is used as a receiver array 7. Alternatively, it is also possible to measure with two ultrasound transducers 5 (transmitter and receiver) alternately at various axial positions over a plurality of injection molding cycles.

An ultrasound pulse passed from an ultrasound transducer 5 of the transmitter array 6 into the plasticizing cylinder passes through the first half of the wall 2 of the plasticizing cylinder, further through the plastic melt and thereafter through the second half of the wall 2 of the plasticizing cylinder to the opposite ultrasound transducer 5 of the receiver array 7. The transit times $t_s$, $t_e$ through the wall 2 of the plasticizing cylinder still have to be deducted from the total transit time $t_{total}$, measured in that way, of the ultrasound pulse. Those transit times can be ascertained by reflection measurements by means of the ultrasound transducers 5 in the transmitting and receiving arrays 6 and 7. The speed of sound $c_L$ is deduced from $$C_L(p = p_{dynamic}, T_m) = \frac{d_{cylinder}}{t_{total} - \frac{t_s}{2} - \frac{t_e}{2}}$$

An axial temperature profile in the screw prechamber 3 is afforded by the measurement at various axial positions. Calculation is effected in an evaluation unit 8 shown in FIGS. 4 and 7. Regulation is effected by way of a closed-loop regulating device 9.

The measurement of $t_e$ is relatively tedious. On the assumption that an almost rotationally symmetrical temperature profile prevails in the wall 2, $t_e$ is approximately equal to $t_s$. It is thus possible to dispense with the measurement of $t_e$.

In all embodiments, the ultrasound transducers 5 bear against the wall 2 of the plasticizing cylinder and are therefore not disposed in bores in the wall 2, which extend through the wall 2. It would be conceivable for the ultrasound transducers 5 to be arranged so as to be sunk in blind bores in the wall 2, for example, in the case of space problems with heating bands mounted on the plasticizing cylinder.

Presetting of the desired temperature gradient is effected, for example, by way of a profile generator 10. The relationship between metering volume flow with volumetric metering or metering mass flow with gravimetric metering and a change in the melt temperature will preferably be made available to the closed-loop regulating system in the form of a family of characteristic curves. Calibration of the characteristic curve is preferably effected in an automated process.

As the melt temperature at a measurement position in the screw prechamber 3 can no longer be altered at the moment of measurement, the regulating system is a learning system, that is to say the items of information that the system acquires from temperature measurement in the currently prevailing cycle of the plasticizing unit 1 or the injection molding machine are used for calculation of the control parameter or parameters in the subsequent cycle. The system therefore needs a certain number of cycles in order to set the desired temperature gradient in the screw prechamber 3. That, however, does not represent a limitation as no dynamic changes in the melt temperature will occur in a process which is in a stable and steady state.

The system can optionally be integrated into the machine control system of the injection molding machine or can be used as an independent system. By virtue of the fact that no sensor bores are required for temperature measurement, the stand-alone variant has the advantage that only one measuring and regulating unit is required for a plurality of injection molding machines.

The invention claimed is:

1. A method of influencing a temperature of a melt in a plasticizing cylinder of a plasticizing unit for an injection molding machine having a plasticizing screw arranged rotatably and configured to be displaced linearly in a cylinder bore of the plasticizing cylinder which extends axially, wherein metering of plastic granular material fed to the plasticizing unit is effected in dependence on a desired temperature of the melt in the plasticizing unit, wherein an axial temperature profile of the melt is determined based on ultrasound measurements including reflected or transmitted ultrasound pulses at several axial positions of the plasticizing cylinder, wherein the metering of the plastic granular material is effected in dependence on the axial temperature profile of the melt, and wherein the plasticizing screw is underfed during the metering.

2. The method as set forth in claim 1, wherein the plasticizing screw is underfed during the metering in such a way that an effective screw length of the plasticizing screw is constant.

3. The method as set forth in claim 1, wherein the plasticizing screw is underfed during the metering in such a way that an effective screw length of the plasticizing screw is shortened.

4. The method as set forth in claim 1, wherein the plasticizing screw is underfed during the metering in such a way that an effective screw length of the plasticizing screw is increased.

5. The method as set forth in claim 1, wherein a desired temperature gradient of the axial temperature profile of the melt in the plasticizing cylinder is predetermined and the metering is effected in such a way that the desired temperature gradient is set in the plasticizing cylinder.

6. The method as set forth in claim 1, wherein the temperature of the melt in the plasticizing cylinder is ascertained with ultrasound transducers.

7. A method of influencing a temperature of a melt in a plasticizing cylinder of a plasticizing unit for an injection molding machine having a plasticizing screw arranged rotatably and configured to be displaced linearly in a cylinder bore of the plasticizing cylinder which extends axially, wherein metering of plastic granular material fed to the plasticizing unit is effected in dependence on a desired temperature of the melt in the plasticizing unit, wherein an axial temperature profile of the melt is determined based on ultrasound measurements including reflected or transmitted ultrasound pulses at several axial positions of the plasticizing cylinder, wherein the metering of the plastic granular material is effected in dependence on the axial temperature profile of the melt, and wherein the determination of the axial temperature profile of the melt is effected in an evaluation unit and regulation of the axial temperature profile of the melt is effected by a closed-loop regulating device, whereby the temperature of the melt is regulated by a change in a rotary speed of a motor of the plasticizing screw or by a change in dynamic pressure regulation of the plasticizing unit.

8. The method as set forth in claim 7, whereby the temperature of the melt is regulated by the change in the rotary speed of the motor of the plasticizing screw and by the change in the dynamic pressure regulation of the plasticizing unit.

9. A method of influencing a temperature of a melt in a plasticizing cylinder of a plasticizing unit for an injection molding machine having a plasticizing screw arranged rotatably and configured to be displaced linearly in a cylinder bore of the plasticizing cylinder which extends axially, wherein metering of plastic granular material fed to the plasticizing unit is effected in dependence on a desired temperature of the melt in the plasticizing unit, wherein an axial temperature profile of the melt is determined based on ultrasound measurements including reflected or transmitted ultrasound pulses at several axial positions of the plasticizing cylinder, wherein the metering of the plastic granular material is effected in dependence on the axial temperature profile of the melt, wherein the plasticizing screw is underfed during the metering in such a way that an effective screw length of the plasticizing screw is shortened and increased, and wherein, depending on a supplied volume flow of the plastic granular material, a position of an initial pressure build-up is varied, which corresponds to a change in the effective screw length of the plasticizing screw.

* * * * *